N. N. BOYDEN.
VALVE CONSTRUCTION.
APPLICATION FILED OCT. 11, 1912. RENEWED DEC. 17, 1913.
1,087,635.
Patented Feb. 17, 1914.
2 SHEETS—SHEET 1.
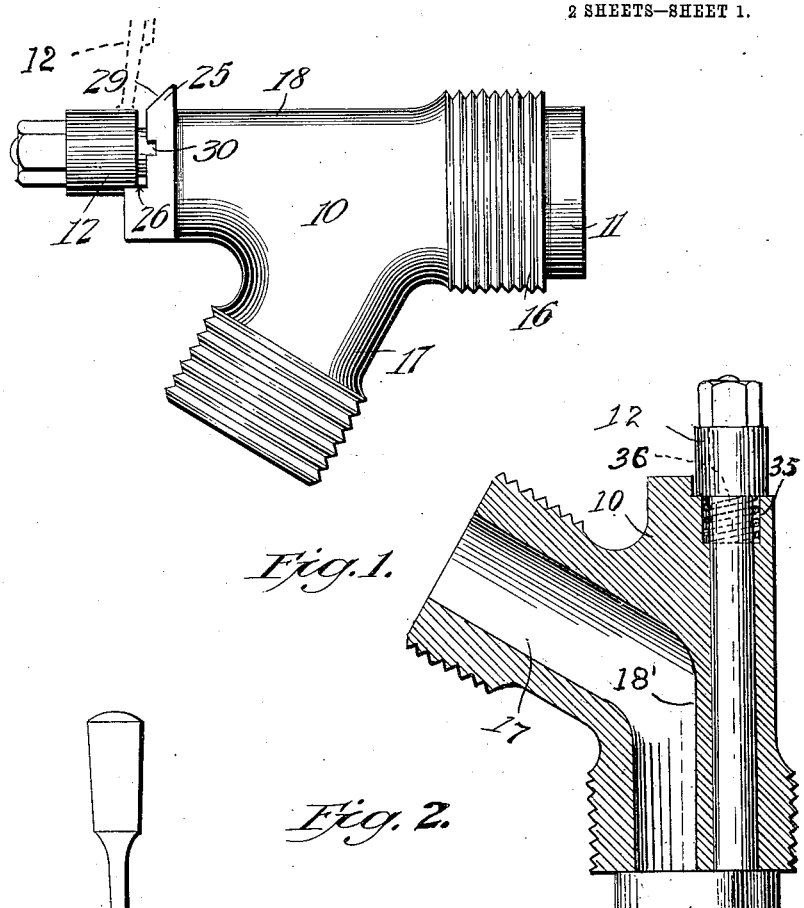
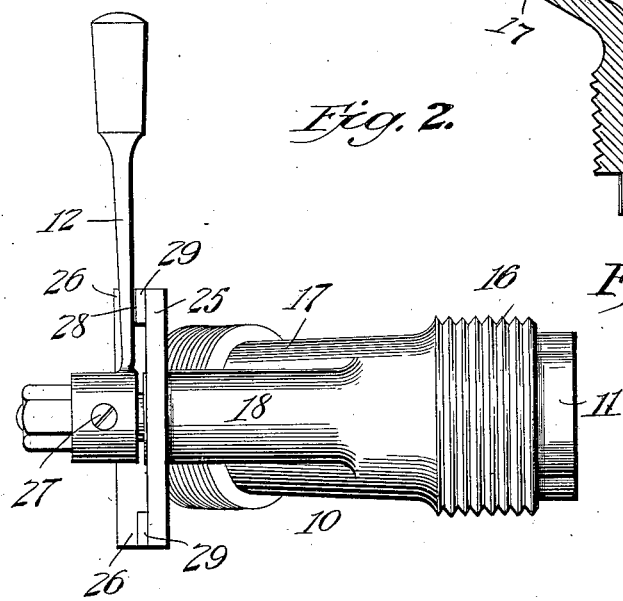

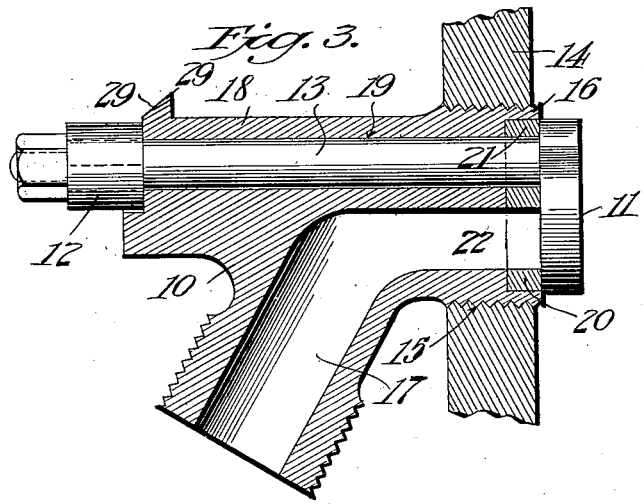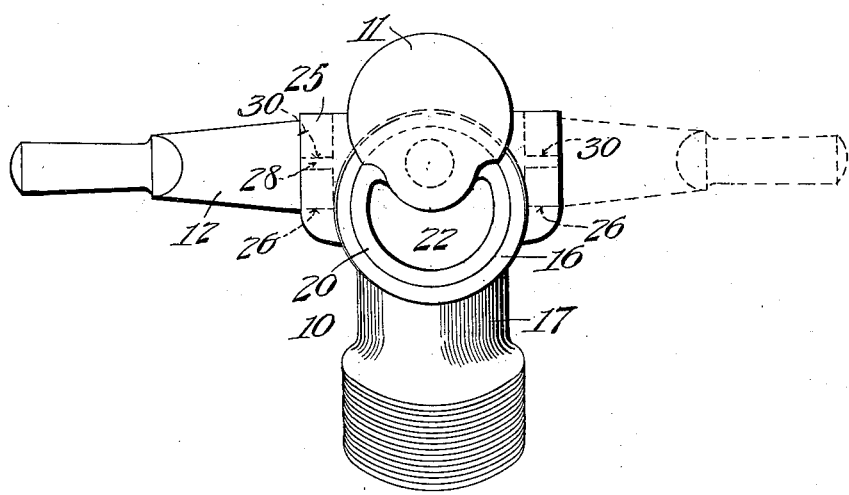

UNITED STATES PATENT OFFICE.

NATHANIEL N. BOYDEN, OF KNOXVILLE, TENNESSEE, ASSIGNOR OF ONE-HALF TO WILLIAM S. MURRIAN, OF KNOXVILLE, TENNESSEE.

VALVE CONSTRUCTION.

1,087,635.      Specification of Letters Patent.      Patented Feb. 17, 1914.

Application filed October 11, 1912, Serial No. 725,264. Renewed December 17, 1913. Serial No. 807,354.

*To all whom it may concern:*

Be it known that I, NATHANIEL N. BOYDEN, a citizen of the United States, residing at Knoxville, in the county of Knox and State of Tennessee, have invented new and useful Improvements in Valve Construction, of which the following is a specification.

This invention relates to valves, and particularly to valves suitable for use as blow-off valves, gage cocks or the like on steam boilers.

An object of the invention is to provide an improved construction of such devices whereby the valve will be maintained on a secure seat, the maximum clearance within the body of the casing be obtained for a given size of opening in which the device is to be engaged, and the valve maintained securely in open or closed position.

Another object of my invention is to so construct a blow-off valve that a discharge passage without abrupt turns or angles and without restrictions along its extent and having a continuous surface without angular corners or recesses will be provided from the inlet end of the valve to the outlet thereof, so that the blow-off valve will be adapted to carry off sludge and other matter iwthout accretion and clogging, and without any liability of damage by the freezing of water retained therein.

A further object of the invention is to so arrange the passage through the valve that when the valve is open, the steam will be directed laterally or radially outward instead of being discharged in the direction of the axis of the valve. This is an important feature inasmuch as it prevents any chance of the person opening the valve being scalded by the escaping steam.

A further object is to so form the valve that if the body of the valve is broken off, pressure will not be relieved thereby, the valve will be held firmly to its seat, and thus the liability of damage due to accident be materially decreased.

A further object is to so form the valve that leakage of steam through the valve stem bore will be prevented at all times.

A still further object is to provide resilient means for holding the valve to its seat, and in this connection to provide a handle whereby the valve may be rotated from its open to its closed position and vice-versa, said handle acting not only to resiliently draw the valve to its seat as it is moved to a closed position, but also acting to lock the valve in either its closed or its open position, the handle to this latter end co-acting with the head of the valve body or plug.

A further object of the invention is to so form the valve that the initial movement of the handle, in shifting the valve from a closed to an open position, will act to relieve the resilient pressure upon the valve so as to permit the valve to be readily turned, and a still further object is to so form the valve and valve body that the maximum area of the valve will be submitted to the action of the steam within the boiler, and to so arrange the valve and valve body that when the valve is turned from its closed to its open position, the inner face of the valve will escape the inner face of the boiler and not have frictional contact therewith.

Other objects and advantages will be apparent, some of them from the following description and from the drawings, in which—

Figure 1 is a side view of the device, Fig. 2 is a top view, Fig. 3 is a sectional view in the major plane of the device, Fig. 4 is a bottom view with the device in open position, Fig. 5 is a sectional view of a modification of the device.

It is desired to note at the start that but three essential elements are required for the construction of the valve, these being the valve or plug body 10, the valve 11 and the handle 12 secured to the stem 13 of the valve.

In Fig. 3 there is illustrated a fragment 14 of a boiler in which the usual threaded opening 15 has been provided in the proper situation for the fitting of the blow-off valve. The plug body 10 is provided with the slightly enlarged cylindrical base portion 16 exteriorly threaded, and of such length that its inner end projects slightly beyond the inner surface of the boiler. The plug body is reduced abruptly in thickness immediately beyond the threaded base 16, and an oblique tubular extension 17 is formed integrally therewith and extends radially downward and outward for a suitable distance and is adapted in any desirable manner for engagement with pipe or other connections, if desired. The extension corresponds in size to the reduced portion of the casing inwardly thereof, at its base, but may taper toward its outer end to a slight degree if desired. It is to be particularly noted that the passage in the extension forms a continuation of that in the body of the plug, and that these two passages join on a curve, so that no angles are presented which would tend to impede the passage of sludge. It is further to be noted that the inner face or wall of this passage is continuous and unbroken, so that sludge and other foreign matter cannot collect in any recesses, projections or shoulders. The diameter of the bore of the extension is slightly greater than the bore of the plug body, and by reason of the greater clearance in the outward continuation of the bore, the thorough clearance of water and sludge is assured, so that the passages will not tend to become clogged neither will there be sufficient water contained in the device to render it liable to freeze. The complete draining of the bore is further secured by the fact that the extension 17 is directed downwardly, so that any water that may collect within the bore will tend to drain away.

Formed integral with the plug body is a valve stem housing 18, through which a bore 19 extends from the front end to the rear end of the plug body. This bore 19 is disposed as close to the periphery of the plug body as possible without interfering with the threads of the base portion 16 or unduly weakening the device. In this bore is disposed the valve stem 13 carrying at its inner end the valve 11, and at its outer end the handle 12, as previously stated. The inner end of the plug body projects slightly inward of the inner face of the boiler sheet 14, and this inner end may either be smoothly finished to as nearly a perfect plane as possible to form a seat for the valve 11, or a special seat 20 having a circular or cylindrical perimeter may be fitted in a corresponding recess in the inner end of the plug bores. If the plug is made of brass or like metal, this special seat 20 is not necessary, but if the plug is made of iron or like material it is best to provide the seat 20. It is obvious also that the seat 20 might be made of some material which would act as a packing for the valve when the valve is drawn inward to its seat, and therefore I do not wish to be limited to the use of metal to form the seat 20. In Fig. 3, I have shown the plug body as provided with the seat 20, while in Fig. 5, I have shown it without this seat. This fitting comprises therein an extension of the valve stem housing, as at 21, the recess for the seat fitting circumscribing the bore and extending outwardly thereof a proper distance at the nearest point of proximity. The seat 20 should be of non-corrosive metal or one well adapted to work to a proper seat with the valve 11. The inner end of the plug body has a crescent-shaped passage 22 therethrough, the inner side of which is next to and concentric with the bore 19, but spaced a distance therefrom so that a portion of the seat surface intervenes for a purpose to be made clear. By this construction the clearway through the base is reduced in a minimum degree, the passage also leading to the extension 17 in the most direct manner.

The valve has somewhat the shape of a shield, and comprises a plane body, the major perimeter of which is circular in form, slightly smaller than the base 16 and of a diameter permitting it to clear the sides of the opening in the boiler when in closed position to permit the plug base to be screwed thereinto. The plane surface of the valve surrounds the stem, extending outwardly therefrom on the side nearest the perimeter of the base but within a continuation of the arc of the major periphery, and being concentric with the stem, the edge at this part being continued concentric with the stem and curved outward at a proper distance on each side of the stem to allow the full opening to be cleared when the valve is in fully opened position, the adjacent edges of the valve and opening being then in alinement, and corresponding in outline.

The base of the plug is intended to be screwed into the boiler until it projects inwardly from the inner surface, and should be so located that the valve may readily swing outward to one side or the other for opening. When in open position, it will be seen that the escape of steam around the stem is guarded against by the portion of the valve projecting from the stem.

The outer end of the plug body is provided with a transversely extending head 25, transverse to the major plane of the plug, the outer face of which is cut away transversely so as to form a shoulder 26 adapted to check, at opposite limits of its movement, the handle 12, secured adjustably on the squared outer end of the stem, which projects a suitable distance. The handle is provided with a squared opening in its inner end fitting snugly over the end of the stem, and a set screw 27 is engaged therein and against the stem to hold the handle in place. The handle is gradually reduced in thickness toward its inner end so as to form a portion 12ª which is resiliently yielding. At a suitable point intermediately of the length of the handle, on its inner side face there is formed a boss 28, and the cross head 25 is provided at each end on its outer side with an inclined or beveled edge 29, upon which the tooth may ride as the handle is moved to a horizontal position, flexing the handle slightly and engaging in the adjacent notches 30, according to the direction the handle is swung. The notches 30 are horizontal and parallel to the shoulder 26, and it will be noted from Fig. 1 that these notches 30 are less in depth than the beveled edge 25. The handle should be of such material as to allow it to resiliently give to the pressure of the boss on the beveled edge 29, and is so adjusted on the stem as to be maintained under slight flexure at each limit of its movement. It is also adjusted in such relation to the valve that when the valve is closed the boss will be engaged in one of the notches, and in this way the resilience of the handle serves both to hold the valve in open or closed position, and also to bear the valve forcibly against its seat. This is due to the fact that the notches 30 are less in depth than the depth of the beveled edge portion 29, so that when the boss 28 springs into the notch 30, the handle will still be under tension.

The valve plug with the cross head 25 may be cast integrally, and the valve may be made in the manner usually followed in the production of mushroom valves.

It should be noted that by forming the ports in the valve in the manner shown and described, that is to say, in the form of an eccentric crescent rather than a circular opening, a much larger rate of flow of steam through the valve is permitted, and the maximum capacity of the opening in the boiler with a valve of this type will be made use of. The specific relation of the crescent-shaped port or passage to the axis of the plug is entirely distinct from the familiar use of a concentrically curved port or passage and rotating valve. Such ports cannot extend over an arc concentric with the axis of the plug of more than 180 degrees and still be cleared by a concentrically moving valve of this type. It will be observed, however, that in my valve the opening extends over an arc of about 265 degrees. It will be found in the art that no arcuate valve port of this type has heretofore equaled 180 degrees, and most of them are much shorter.

I show in Fig. 4 of the drawings a modification of the device wherein the stem housing 18′ is provided at its outer end with a suitable recess 35 formed in an enlargement of the bore 19, in which recess there is disposed a suitable helical spring 36 surrounding the stem and bearing against the enlarged head of the handle 12. The remainder of the construction may be as before described.

As before stated the resiliency of the handle 12 as illustrated in Fig. 2 serves to draw the valve 11 to its seat, but the same function is secured by the use of the spring 35, and in this case the handle may be simply used as a means of locking the valve in its closed or open position.

It will be obvious that this invention is well adapted to use in various situations other than in connection with steam boilers, and has especial value for use as a valve in numerous confined situations, as on account of the extension 17 it may be so used in situations in which many other valves could not be conveniently operated.

With either form of the device as described, the valve is well adapted to use with high or low pressures, and for controlling various fluids, the helical spring being particularly desirable in case a hand wheel is used in place of the lever handle described, the spring 35 acting to draw the valve 11 into such close frictional contact that the inner end of the plug body has to hold the valve to its seat and resist any turning movement of the valve spindle.

It is found in the art that all valves adapted for use as blow-off valves prior to my invention, and including a valve rotating or oscillating in or parallel to a seat for sliding engagement therewith are easily rendered inoperative by freezing and are more liable to freeze than the valve constructed as preivously described. The blow-off valves prior to my invention are so constructed that they are exposed, and water may freeze around the valve and so obstruct its movement. By my construction, the valve is located within the boiler and utilizes the space within the boiler and surrounding the inner end of the plug in place of a special casing to inclose the valve when opened. By the elimination of the inclosing casing, and by the elimination of a chamber within which the valve is inclosed, the liability of sludge accumulating in the path of the valve is reduced, and further, the valve being supported when opened out of contact with the inner face of the boiler or any other part, and when closed resting only against the smooth contacting face of the seat or the end of the valve plug, the accumulation of sludge is prevented and the liability of freezing very greatly reduced. Further, when the valve is open, steam may pass all around the valve by reason of the fact that the valve is spaced from the boiler seat, and thus the steam will act to clean the valve. Again, the association of the crescent-shaped port or passage with the scutate valve so increases the capacity of this type of blow-off valve that its scope of application is very greatly enlarged.

It may be pointed out that the valve being of the same shape as the seat or ring 20, and of very slightly less diameter, is positively drawn against its seat either by the resilient action of the handle or the resilient action of the spring 35. It is further to be noted that on shifting the valve from its closed position to its open position, the resilient pressure which holds the valve to its seat is relieved, and by loosening the nut on the end of the valve stem, and also loosening the set-screw 27, the handle may be shifted slightly outward, thus permitting the valve spindle to be shifted inward after the boss has passed out of the notch 30, thus relieving the frictional contact of the valve with the end of the plug body, and permitting an easy opening movement of the valve or an easy closing movement of the valve to a position covering the end of the body, after which the handle may be again shifted by rotating the nut on the end of the valve spindle, and the valve drawn positively to its seat. Furthermore, this construction permits the valve to be positively locked, if desired. Thus, for instance, after the handle has been turned to the horizontal position shown in dotted lines in Fig. 4, and the valve thereby closed, the nut 13ª on the end of the valve spindle may be turned up so tightly as to force the tooth, lug, or boss 29 into such tight engagement with the notch 30 that it is practically impossible to turn the valve from its closed to its open position until the nut 13ª be turned off, thus releasing the pressure and permitting the handle to be operated in the usual fashion. Of course, even though the nut 13ª be released and the handle shifted slightly along the spindle, the pressure of steam within the valve will hold the valve snugly to its seat while it is being turned.

What is claimed is:

1. In a valve of the class described, the combination of a casing having a base adapted for engagement in a boiler being provided with an inner end at right angles to the axis of the valve, a duct opening outwardly therefrom, a stem housing forming a part of the casing having a bore opening on the inner end of the casing, a plane valve adapted to seat slidably on the inner end of the casing and having a stem engaged revolubly in said housing and projecting from the outer end thereof, a laterally extending resilient handle carried at the outer end of the stem, and means on the outer end of the housing arranged and adapted to engage and flex the handle when the valve is closed but releasing the handle from flexing strain when the valve is opened.

2. A valve of the class described comprising a casing having a base adapted for engagement in and to project within a boiler, and having a plane inner end, a duct opening from the said end and laterally from the casing outwardly of the base, a stem housing at one side of the casing having a bore opening on the inner end of the casing base, a plane valve adapted to seat slidably on the inner end of the casing, and having a stem engaged revolubly in said housing and projecting from the outer end thereof, a cross piece on the outer end of the casing having a plurality of notches extending horizontally and parallel to the length of the cross piece, and a resilient operating handle for the stem having a tooth adapted to engage in either one of the notches, and positioned to bear resiliently upon the cross piece to bear the stem and valve outwardly and hold the tooth in the notches.

3. In a blow-off valve, a valve body having a passage extending through it from its inner end, said passage at its inner portion being crescent-shaped, the largest diameter of the crescent-shaped passage being equal to the largest diameter of the remainder of the passage, said valve body having a bore disposed between the cusps of the crescent and concentric with the convex portion of the wall of the passage between said cusps, said bore being eccentric to the axis of the valve body, a valve spindle disposed in the bore, and a valve mounted on the end of the spindle and moving over the inner end of the valve body, said valve having an arcuate major perimeter larger in diameter than the diameter of the crescent-shaped passage and having an arcuate minor perimeter concentric to the wall surrounding the spindle bore and adapted thereby to register therewith at all times.

4. In a blow-off valve, a valve body having a cylindrical base, said body having a passage extending through it, the inner portion of said passage being crescent-shaped and being defined by a major arcuate concave wall and a minor reëntrant convex wall disposed between the cusps of the crescent, the major concave wall having a diameter equal to the diameter of the remainder of the passage and its perimeter having a curvature the same as the curvature of the remainder of the passage, said valve body having a spindle receiving bore disposed between the cusps of the crescent and concentric with the curvature of the minor wall of the said passage but eccentric to the axis of the valve body, a valve spindle disposed in said bore, and a valve mounted on the inner end of the spindle and engaging the inner end face of the body and having an arcuate convex major circular perimeter larger in diameter than the diameter of the crescent-shaped passage and having an arcuate minor convex perimeter of the same diameter as the convex portion of the wall of the passage and concentric thereto and adapted to register therewith at all times.

5. In a blow-off valve, a valve body having a cylindrical base, said body having a passage extending through it, the inner portion of said passage being crescent-shaped and being defined by a major arcuate concave wall and a minor reëntrant convex wall disposed between the cusps of the crescent, the major concave wall having a diameter equal to the diameter of the remainder of the passage and its perimeter having a curvature the same as the curvature of the remainder of the passage, said valve body having a spindle receiving bore disposed between the cusps of the crescent and concentric with the curvature of the minor wall of the said passage but eccentric to the axis of the valve body, a valve spindle disposed in said bore, and a valve mounted on the inner end of the spindle and engaging the inner end face of the body.

6. In a valve of the character described, a valve body having a fluid passage therethrough, a valve spindle rotatably mounted on the body, a disk-like valve carried on the inner end of the spindle and rotatable therewith into position to close or disclose said passage, a resilient handle mounted upon the end of the spindle and extending in an angular direction approximately coincident with the angular direction of the valve, said handle having a boss, a head formed on the outer end of the valve body extending transversely to the body, said head having a supporting shoulder extending in a plane approximately at right angles to the plane of travel of the handle, the outer face of the head being notched, the boss on the handle being adapted to engage the notch whereby to latch the handle in operative position.

7. In a valve of the character described, a valve body having a fluid passage therethrough, a rotatable valve spindle mounted in said body, a disk-like valve carried on the inner end of the spindle and bearing against the inner face of the body and movable into a position to close or disclose the passage, a resilient handle mounted on the outer end of the spindle extending in an angular direction approximately coincident with the angular direction of the valve and having a detent upon its inner face, a transversely extending, horizontally disposed head upon the outer face of the body provided with a horizontally disposed handle supporting shoulder extending in a plane approximately at right angles to the plane of travel of the handle, the face of the head above the shoulder being formed with horizontally disposed notches and extending on each side of the spindle and approximately radially thereto, the detent on said handle being adapted to engage with and lock in said notches when the handle is in either of its horizontal positions.

8. In a valve of the character described, a valve body having a fluid passage extending therethrough and a spindle receiving bore also extending therethrough, the outer end of the body being formed with a transversely extending head, said head having a horizontal edge disposed slightly above the said spindle-receiving bore and said head being provided with a horizontally disposed shoulder extending beneath said bore, the face of the head above the shoulder being formed on either side of said bore with a horizontally extending notch, a spindle disposed in said bore, a valve rotatable with the spindle and adapted to close or dis-close said passage, and a resilient handle mounted upon the outer end of the spindle and having a boss upon its inner face adapted to engage with and lock in either one of said notches.

9. In a valve of the character described, a valve body having a fluid passage extending therethrough and a spindle receiving bore also extending therethrough, the outer end of the body being formed with a transversely extending head provided with a horizontally disposed shoulder extending beneath said bore, the face of the head above the shoulder being formed on either side of said bore with a horizontally extending notch, a spindle disposed in said bore, a valve rotatable with the spindle and adapted to close or dis-close said passage, a resilient handle mounted upon the outer end of the spindle and having a boss upon its inner face adapted to engage with said notches in either horizontal position of the handle, and a nut on the end of the spindle engaging said handle to force it inward with relation to the spindle and to draw the spindle outward and the valve to its seat.

10. In a valve of the character described, a valve body having a fluid passage extending therethrough and a spindle bore extending therethrough, the outer end of the body being formed with a transversely extending head provided with a horizontal shoulder extending beneath the spindle bore, the face of the head above the shoulder and on each side of the bore being formed with a horizontally extending notch, the upper edge of the head on each side of the bore being beveled outward and downward, the notch being less in depth than the depth of said beveled edge, a handle mounted upon the spindle and having a resilient shank, the inner face of the handle being formed with a boss adapted to engage in the said notch when the handle is in either of its horizontal positions, the boss on the handle projecting when the handle is in a vertical position over the inclined edge of the head so as to flex the handle when the handle is moved to a horizontal position.

11. In a valve of the character described, a valve body having a fluid passage therethrough and a spindle bore extending therethrough, the outer end of the valve body being formed with a transversely extending head provided with a horizontal shoulder disposed below the bore, the face of the head being formed with a notch on each side of the bore, the upper edge of the head being beveled, said notch being less in depth than the depth of the beveled edge, a spindle extending through the bore, a valve on the inner end of the spindle adapted to engage against the inner end of the valve body to close or disclose the passage therethrough when rotated with the spindle, a handle mounted upon the outer end of the spindle and having a resilient shank provided with an inwardly projecting boss adapted to engage with the beveled edge of the head as the handle is turned to a horizontal position and engage in said notches when the handle is in a horizontal position, and a nut on the end of the spindle forcing said handle toward the head and drawing the valve into position against the inner end of the body.

12. In a valve of the character described, a valve body having a discharge passage extending therethrough from its inner to its outer end and having a spindle bore extending therethrough, a rotatable spindle mounted in the bore, a disk-like valve carried on the end of the spindle and engaging the inner end of the valve body to close said passage, means for positively drawing the valve spindle in an outward direction to lock the valve to its seat, means for locking the valve spindle in its rotated position, and means for resiliently urging the valve to its seat.

In testimony whereof I have hereunto set my hand in presence of two subscribing witnesses.

NATHANIEL N. BOYDEN.

Witnesses:
 H. S. WOODWARD,
 CHR. R. NIELSEN.

---

Copies of this patent may be obtained for five cents each, by addressing the "Commissioner of Patents, Washington, D. C."